(12) United States Patent  
He

(10) Patent No.: US 9,081,455 B2  
(45) Date of Patent: *Jul. 14, 2015

(54) TOUCH PANEL AND MANUFACTURING METHOD THEREOF

(71) Applicant: NANCHANG O-FILM TECH. CO., LTD., Jiangxi (CN)

(72) Inventor: Zhao He, Jiangxi (CN)

(73) Assignee: Nanchang O-Film Tech. Co., Ltd., Jiangxi (CN)

( * ) Notice: Subject to any disclaimer, the term of this patent is extended or adjusted under 35 U.S.C. 154(b) by 112 days.

This patent is subject to a terminal disclaimer.

(21) Appl. No.: 13/985,934

(22) PCT Filed: Jul. 8, 2013

(86) PCT No.: PCT/CN2013/078990  
§ 371 (c)(1),  
(2) Date: Aug. 16, 2013

(87) PCT Pub. No.: WO2014/134896  
PCT Pub. Date: Sep. 12, 2014

(65) Prior Publication Data

US 2014/0253824 A1  Sep. 11, 2014

(30) Foreign Application Priority Data

Mar. 8, 2013 (CN) .......................... 2013 1 0074659

(51) Int. Cl.  
*G06F 3/041* (2006.01)  
*G06F 3/044* (2006.01)

(52) U.S. Cl.  
CPC ...... *G06F 3/044* (2013.01); *G06F 2203/04103* (2013.01); *G06F 2203/04112* (2013.01)

(58) Field of Classification Search  
USPC ................. 178/18.01; 345/173, 174; 200/600  
See application file for complete search history.

(56) References Cited

U.S. PATENT DOCUMENTS

2010/0123670 A1   5/2010  Philipp  
2011/0292311 A1*  12/2011  Qian et al. ...................... 349/38  
(Continued)

FOREIGN PATENT DOCUMENTS

CN   102063232 A   5/2011  
CN   102216891 A   10/2011  
(Continued)

OTHER PUBLICATIONS

Communication From the Chinese Patent Office Regarding a Counter-Part Foreign Application Date Feb. 13, 2014.

(Continued)

*Primary Examiner* — Thuy Pardo  
(74) *Attorney, Agent, or Firm* — Rosenberg, Klein & Lee

(57) ABSTRACT

A touch panel includes: a first transparent insulating substrate; a second transparent insulating substrate, comprising a first surface which is faced to the first transparent insulating substrate and a second surface opposite to the first surface; a sensing electrode layer, disposed between the first transparent insulating substrate and the second insulating substrate, the sensing electrode layer comprising a plurality of independently disposed sensing electrodes; and a driving electrode layer, disposed on the first surface or the second surface of the second transparent insulating layer, the driving electrode layer comprising a plurality of independently disposed driving electrodes, each driving electrode comprising a meshed conductive circuit. A method of manufacturing a touch panel is also disclosed. The touch panel has a lower cost and a higher sensitivity.

28 Claims, 17 Drawing Sheets

(56) References Cited

U.S. PATENT DOCUMENTS

| | | | |
|---|---|---|---|
| 2012/0113027 A1* | 5/2012 | Song et al. | 345/173 |
| 2012/0127387 A1* | 5/2012 | Yamato et al. | 349/42 |
| 2012/0154309 A1* | 6/2012 | Yoshifusa et al. | 345/173 |
| 2012/0169658 A1* | 7/2012 | Sekizawa | 345/174 |
| 2013/0015908 A1* | 1/2013 | Shih et al. | 327/517 |
| 2013/0043116 A1* | 2/2013 | Shih et al. | 200/600 |
| 2013/0135540 A1* | 5/2013 | Nam et al. | 349/12 |
| 2013/0256008 A1* | 10/2013 | Zeng et al. | 174/257 |
| 2013/0271388 A1* | 10/2013 | Chu et al. | 345/173 |
| 2013/0319840 A1* | 12/2013 | Ku et al. | 200/600 |
| 2014/0098051 A1* | 4/2014 | Hong et al. | 345/173 |
| 2014/0104199 A1* | 4/2014 | Lee et al. | 345/173 |
| 2014/0110239 A1* | 4/2014 | Lee et al. | 200/600 |
| 2014/0197018 A1* | 7/2014 | Chen | 200/600 |

FOREIGN PATENT DOCUMENTS

| | | |
|---|---|---|
| CN | 102903423 A | 1/2013 |
| CN | 102930922 A | 2/2013 |

OTHER PUBLICATIONS

Communication From the Chinese Patent Office Regarding a Counter-Part Foreign Application Date Dec. 24, 2013.

* cited by examiner

TOUCH PANEL AND MANUFACTURING METHOD THEREOF

FIELD OF THE INVENTION

The present disclosure relates to a field of touch technology, and more particularly relates to a touch panel and a manufacturing method thereof.

BACKGROUND OF THE INVENTION

Touch panel is widely used in various kinds of electronic devices with screens, such as computers or electronic devices which include smart phone, TV, PDA, tablet PCs, notebook computers, machine tools with industrial display touch, integrated computers and ultra books, etc. The touch panel can be divided into a capacitive touch panel, a resistive touch panel and a surface wave touch panel etc. according to the working principle.

The capacitive touch panel functions by utilizing the induced current of a human body. When a finger touches the touch panel, the user and a surface of the capacitive touch panel form a coupling capacitor due to a body electric field, for a high frequency current, the capacitor is a conductor, a small current pass through from the contact point of the finger. The current flow out from the electrodes located in four corners of the capacitive touch panel, and the current pass through the four electrodes is proportional to the distance between the finger and four corners, the four current ratios are precisely calculated by a controller to get a position of the touch point.

All current touch panels are using ITO (indium tin oxide) glass or ITO film (i.e. formed on the glass or on the film) to form patterns of driving electrodes and sensing electrodes. But the driving electrode and sensing electrode patterns formed by the ITO glass or ITO film have the following disadvantages: on one hand, the ITO driving electrode or sensing electrode bulges on the surface of the glass or transparent film, it is easy to be scratched or peeled off, which would lead to the decrease of the production yield; on the other hand, the main material of ITO glass or ITO film is a rare metal of indium, the indium is rare, so it is costly, and the resistance or surface resistance of a large size touch ITO panel is large, which affects the signal transmission speed and results in poor touch sensitivity, thus affecting the electronic product functions, and the user experiences are poor.

SUMMARY OF THE INVENTION

The present disclosure is directed to provide a touch panel with low cost and high sensitivity.

In addition, the disclosure is directed to provide a manufacturing method of a touch panel.

A touch panel, includes: a first transparent insulating substrate; a second transparent insulating substrate, comprising a first surface which is faced to the first transparent insulating substrate and a second surface which is opposite to the first surface; a sensing electrode layer, disposed between the first transparent insulating substrate and the second insulating substrate, the sensing electrode layer comprises a plurality of independently disposed sensing electrodes, each sensing electrode comprises a meshed conductive circuit; and a driving electrode layer, disposed on the first surface or the second surface of the second transparent insulating layer, the driving electrode layer comprises a plurality of independently disposed driving electrodes, each driving electrode comprises a meshed conductive circuit.

A touch panel, includes: a rigid transparent insulating substrate; a sensing electrode layer, formed on a surface of the rigid transparent insulating substrate, [comprising] a plurality of independently disposed sensing electrodes, each sensing electrode comprises a meshed conductive circuit; a flexible transparent insulating substrate, comprising a first surface and a second surface which is opposite to the first surface, and a driving electrode layer, formed on the first surface or the second surface of the flexible transparent insulating substrate [the sensing electrode layer] comprising a plurality of independently disposed driving electrodes, each driving electrode of the driving electrode layer comprises a [meshed conductive circuit]; the first surface or the second surface of the flexible transparent insulating substrate is attached to the rigid transparent insulating substrate.

A method of manufacturing a touch panel, includes the following steps: providing a transparent insulating substrate; forming a sensing electrode layer on a surface of the first transparent insulating substrate, a sensing electrode of the sensing electrode layer is a meshed conductive circuit which comprises a plurality of mesh cells; providing a second transparent insulating substrate; forming a driving electrode layer on a surface of the second transparent insulating substrate; a driving electrode of the driving electrode layer is a meshed conductive circuit which comprises a plurality of mesh cells; and attaching the second transparent insulating substrate to the first transparent insulating substrate.

A method of manufacturing a touch panel, includes the following steps: providing a first transparent insulating substrate; providing a second transparent insulating substrate; forming a driving electrode layer on one surface of the second transparent insulating substrate; an electrode of the driving electrode layer is a meshed conductive circuit comprising a large number of mesh cells; forming a sensing electrode layer on the other surface of the second transparent insulating substrate; and attaching the first transparent insulating substrate to the second transparent insulating substrate, a sensing electrode of the sensing electrode layer is a meshed conductive circuit which comprises a plurality of mesh cells.

The driving electrode of the touch panel is manufactured to a conductive mesh formed by the meshed conductive circuit by the above method, the touch panel do not have the problems that the surface is easy to be scratched or peeled off, costly, the surface resistance is high for a large size panel when the ITO film is used, so the touch panel is cost down with higher sensitivity.

DETAILED DESCRIPTION OF THE EMBODIMENTS

Illustrative embodiments of the disclosure are described below. The following explanation provides specific details for a thorough understanding of and enabling description for these embodiments. One skilled in the art will understand that the disclosure may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The "transparent" described in the transparent insulating substrate of the present disclosure can be explained as "transparent" or "substantially transparent"; the insulating in the transparent insulating substrate can be explained as "insulating" or "dielectric". So the "transparent insulating substrate" of the present invention can be explained as but not limited to transparent insulating substrate, substantially transparent insulating substrate, transparent dielectric substrate and substantially dielectric substrate.

Figure 1:
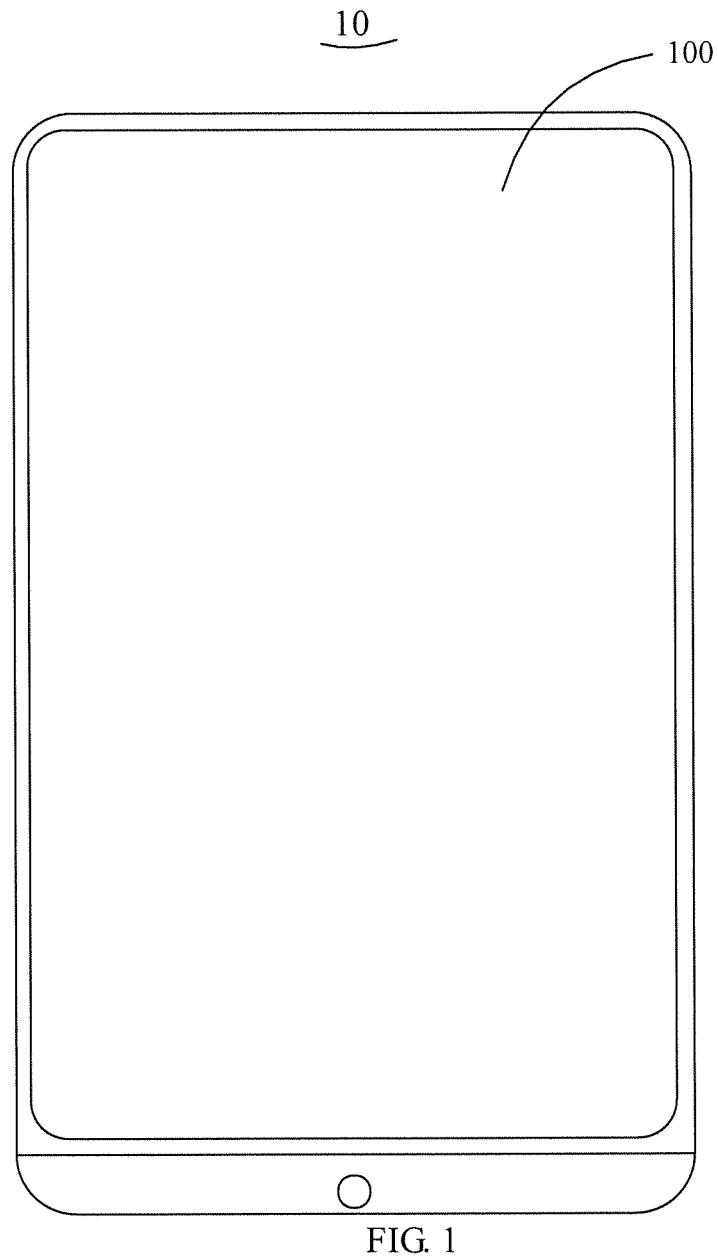
FIG. 1 is a schematic view of an electronic device having a touch panel in accordance with one embodiment.

FIG. 1 shows one embodiment of an electronic device having a touch panel of the present disclosure, where the electronic device 10 is a smart phone or a tablet PC. In the electronic device 10, the touch panel 100 is bonded to an upper surface of a LCD (Liquid Crystal Display) screen, which is used in one of I/O devices of an electronic device for human computer interaction. It is to be understood that the touch panel 100 of the present disclosure can also be applied to electronic devices such as a mobile phone, a mobile communication phone, a TV, a tablet PC, a notebook computer, a machine tool with a touch display screen, a GPS equipment, an integrated computer and an ultra book.

Figure 2:
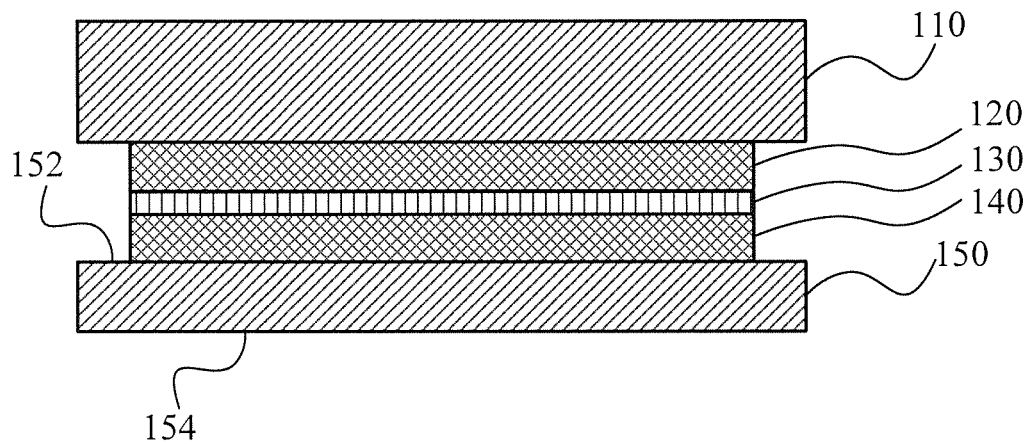
FIG. 2 is a cross sectional view of a first type of touch panels of the present disclosure.

Referring to FIG. 2, it is a cross-sectional view of the first type of embodiments of the touch panel of the present disclosure. The touch panel 100 includes a first transparent insulating substrate 110, a sensing electrode layer 120, an adhesive layer 130, a driving electrode layer 140, and a second transparent insulating substrate 150. The sensing electrode layer 120 is located between the first transparent insulating substrate 110 and the second transparent insulating substrate 150. The second transparent insulating substrate 150 includes a first surface 152 which is faced to the first transparent insulating substrate 110, and a second surface 154 is opposite to the first surface 152. The driving electrode layer 150 is formed on the first surface 152. In the alternative embodiments, the driving electrode layer 150 can also be disposed on the second surface 154.

The adhesive layer 130 is used to bond the first transparent insulating substrate 110 and the second transparent insulating substrate 150 as one. When the driving electrode layer 150 is disposed on the first surface 152, the adhesive layer 130 is used to insulate the sensing electrode layer 120 from the driving electrode layer 140. The adhesive layer can be an optically transparent OCA (optical clear adhesive) or a LOCA (liquid optical clear adhesive).

Figure 3:
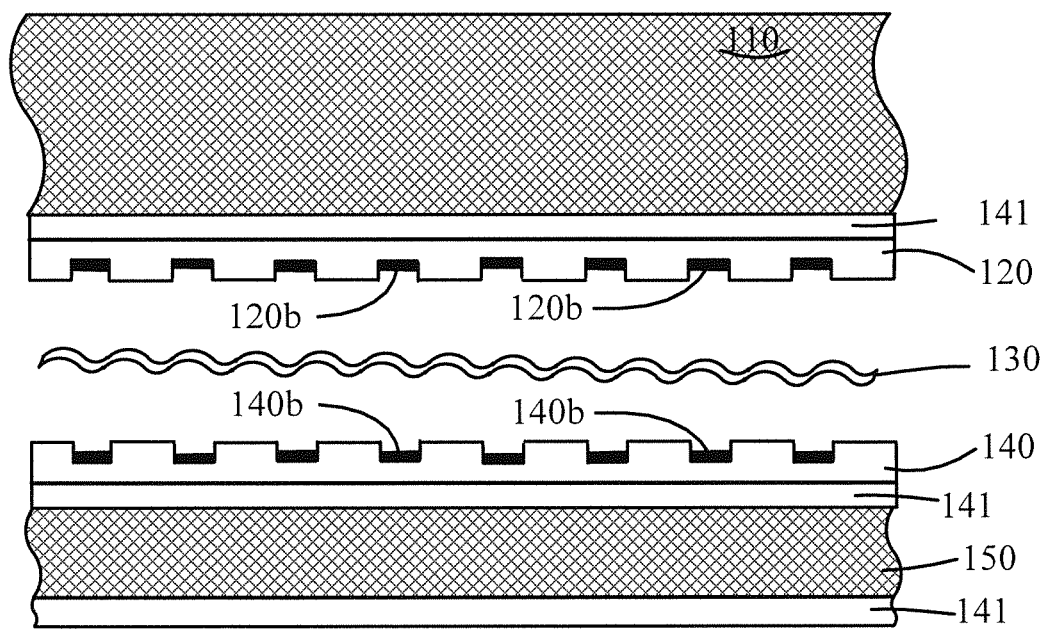
FIG. 3 is a cross sectional view of an embodiment of FIG. 2.
Figure 4:
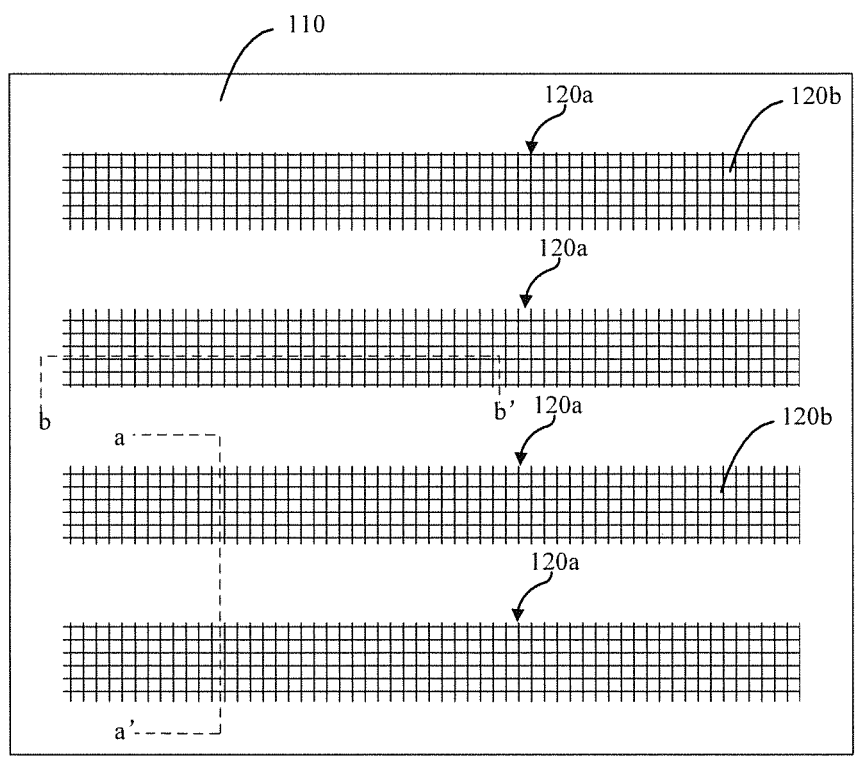
FIG. 4 is a schematic plan view of a driving electrode layer of FIG. 3 forming a surface of a second transparent insulating layer.

FIG. 3 is a cross sectional view of a first type of touch panels in accordance with a specific embodiment. FIG. 4 is a plan view of the sensing electrode layer 120. Referring to FIG. 3 and FIG. 4, the sensing electrode layer 120 includes a plurality of independently disposed sensing electrodes 120a; each sensing electrode 120a includes a meshed conductive circuit 120b. The driving electrode layer 140 includes a plurality of independently disposed driving electrodes 140a. "Independently disposed" described herein can be understood but not limit to several explanations of "independently disposed", "spaced disposed" or "insulated disposed".

In the capacitive touch panel, the sensing electrode and driving electrode are essential two parts of the touch sensing components. The sensing electrode is usually close to a touch surface of the touch panel, the driving electrode is away from the touch surface. The driving electrode is connected to a scanning signal generating device, the scanning signal device provides a scanning signal, and the sensing electrode generates changed parameters when it is touched by a charged conductor to sense the touch position of the sensing region.

Each sensing electrode of the sensing electrode layer 120 is electrically connected to a peripheral sensing detection processing module of the touch panel, each driving electrode of the driving electrode layer 140 is electrically connected to the peripheral excitation signal module of the touch panel, and the sensing electrode and the driving electrode form a mutual capacitor therebetween. When a touch operation occurs on a surface of the touch panel, the mutual conductance of the touch center region will change, the touch operation is converted into an electrical signal, a coordinate data of the touch center region can be obtained by processing the data of the capacitance variation region, the electronic device which can process the related data gets the corresponding exact position of the touch operation on a screen attached to the touch panel according to the coordinate of the touch center region, thus the corresponding function and input operation can be completed.

In the illustrated embodiment, the driving electrode layer 140 and the sensing electrode layer 120 of the present disclosure are manufactured by nearly the same ways. The shapes of the meshed conductive circuits included by the driving electrode layer 140 and the sensing electrode layer 120 can be different.

Figure 5:
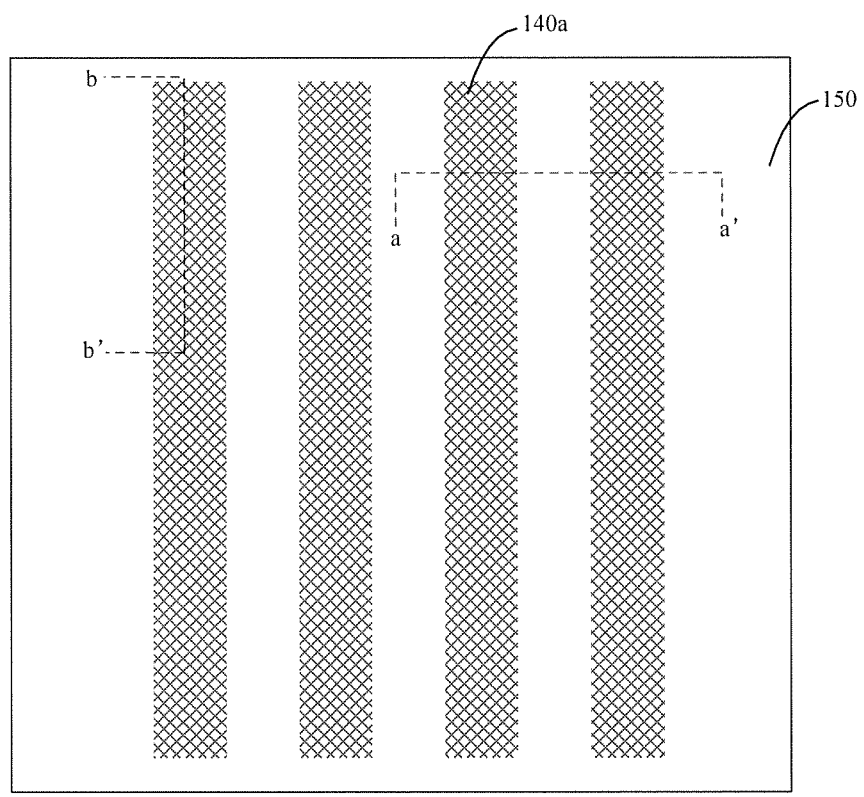
FIG. 5 is a sectional view taken along the line a-a' in FIG. 4 or FIG. 5.
Figure 6:
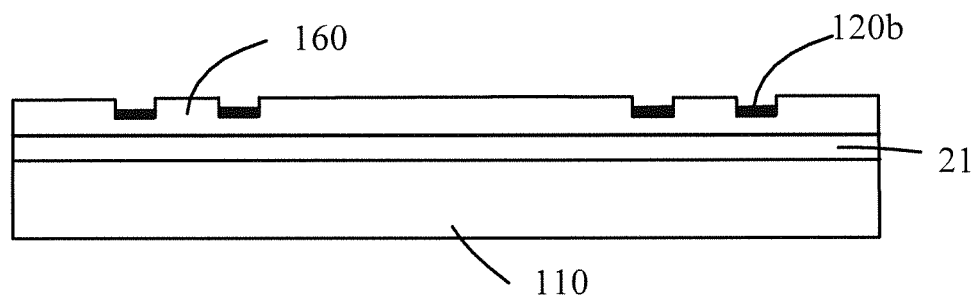
FIG. 6 is a sectional view taken along the line b-b' in FIG. 4 or FIG. 5.
Figure 7:
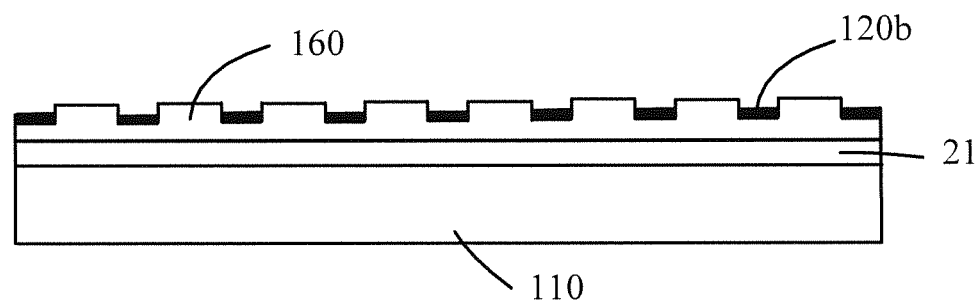
FIG. 7 is a schematic plan view of a sensing electrode layer of FIG. 3 forming a surface of a transparent insulating substrate.

Specifically, FIG. 6 and FIG. 7 are cross-sectional views taken along the lines of a-a' and b-b' in FIG. 4 and FIG. 5 respectively. The sensing electrode layer is selected as an example for illustrating; the sensing electrode layer 120 includes a plurality of independently disposed meshed conductive circuits 120b. The meshed conductive circuit 120b is embedded or buried in the transparent insulating layer 160; the transparent insulating layer 160 is attached to a surface of the first transparent insulating substrate 110 by a tackifier layer 21. The meshed conductive circuit 120b is made of a material selected from a group consisting of gold, silver, copper, aluminum, zinc, gold-plated silver and alloys of at least two above metals. The above materials are easy to obtain and have low cost, especially the meshed conductive circuit 120b made of conductive silver paste has good conductivity with low cost.

It is easy to be understood that, there are several ways that the meshed conductive circuit 120b is embedded or buried in the transparent insulating layer 160. In one preferred embodiment the transparent insulating layer 160 defines a plurality of interlaced grid trenches, the meshed conductive circuit 120b is received in the trench, and thus the conductive grid circuit 120b is embedded or buried in the surface of the transparent insulating layer 160. In the process of moving or handling, because the sensing electrode 120a is firmly attached to the first transparent insulating substrate 110, it is not easy to be damaged or peeled off. It is obviously that the meshed conductive circuit 120b can also be directly embedded or buried in a surface of the first transparent insulating substrate 110.

Specifically, a meshed spacing of the meshed conductive circuit 120b is defined as $d_1$, and 100 μm≤$d_1$<600 μm; a surface resistance of the meshed conductive circuit is defined as R, and 0.1 Ω/sq≤R<200 Ω/sq.

The surface resistance R of the meshed conductive circuit 120b affects the transmission speed of the current signal, thus affecting the responsiveness of the touch panel. Therefore, the surface resistance R of the meshed conductive circuit 120b is preferably defined as 1 Ω/sq≤R≤60 Ω/sq. The surface resistance R in this range can significantly increase the conductivity of the conductive film and significantly improve the signal transmission speed, and the accuracy requirement is lower compared to that of the surface resistance of 0.1 Ω/sq≤ R<200 Ω/sq, the technical requirement is reduced on the premise of ensuring conductivity, the cost is reduced. It can be understood that in the manufacturing process, the surface resistance of meshed conductive circuit 120b (R) is codetermined by several factors of the meshed spacing, material, traces diameter (traces width).

The mesh traces width of the meshed conductive circuit 120b is $d_2$ and 1 μm≤$d_2$≤10 μm. The traces width of the mesh affects the transmittance of the conductive film, the smaller the traces width, the better the transmittance. When the mesh traces spacing $d_1$ of the meshed conductive circuit 120b is defined as 100 μm≤$d_1$<600 μm, the surface resistance R of the meshed conductive circuit 120b is defined as 0.1 Ω/sq≤ R<200 Ω/sq, the mesh traces width $d_2$ is defined as 1 μm≤$d_2$≤10 μm which can satisfy the requirement, and can at the same time enhance the transmittance of the touch panel. Especially when the mesh traces width $d_2$ of the meshed conductive circuit 120b is defined as 2 μm≤$d_2$<5 μm, the larger the transmittance area, the better the transmittance, and the accuracy requirement is relatively low.

In a preferred embodiment, the meshed conductive circuit 120b is made of silver, and the pattern is regular, the mesh traces spacing ranges from 200 μm to 500 μm; the surface resistance of the meshed conductive circuit is defined as 4 Ω/sq≤R<50 Ω/sq, the coating amount of silver ranges from 0.7 g/m² to 1.1 g/m².

In a first embodiment, $d_1$=200 μm, R=4 to 5 Ω/sq, the silver amount is 1.1 g/m², the mesh traces width $d_2$ ranges from 500 nm to 5 μm. It is to be understood, a value of the surface resistance R, an amount of silver would be affected by the mesh traces width $d_2$ and filling trench depth, the larger the mesh traces width $d_2$, the larger the filling trench depth, the surface resistance would increase, the silver amount would also increase.

In a second embodiment, $d_1$=300 μm, R=10 Ω/sq, the silver amount ranges from 0.9 to 1.1 g/m², the mesh traces width $d_2$ ranges from 500 nm to 5 μm. It is to be understood, a value of the surface resistance R, an amount of the silver would be affected by the mesh traces width $d_2$ and filling trench depth, the larger the mesh traces width $d_2$, the larger the filling trench depth, the surface resistance would decrease, the silver amount would also increase.

In a third embodiment, $d_1$=500 μm, R=30 to 40 Ω/sq, the silver amount to be 0.7 g/m², the mesh traces width $d_2$ ranges from 500 nm to 5 μm. It is to be understood, a value of the surface resistance R, an amount of the silver would be affected by the mesh traces width $d_2$ and filling trench depth, the larger the mesh traces width $d_2$, the larger the filling trench depth, the surface resistance would increase; the silver amount would also increase.

It is to be understood, besides that the meshed conductive circuit 120b is made of metal conductive material; it can also be made of a material selected from a group consisting of transparent conductive polymers, carbon nanotubes and graphene.

Similarly, the driving electrode layer 140 and the sensing electrode layer 120 are manufactured nearly by the same way, the same material and the same process. The driving electrode of the driving electrode layer 140 is a meshed conductive circuit 140b which includes a large number of mesh cells.

In the illustrated embodiment, the sensing electrode layer 120 is directly formed on a surface of the rigid transparent insulating substrate 110, and the rigid transparent insulating substrate 110 is a rigid substrate. Specifically, the rigid substrate uses strengthened glass or hardening transparent plastic plate, which is strengthened glass or reinforced plastic plate for short. The strengthened glass includes functional layers with functions of anti-glaring, hardening, antireflection or anti-fogging. The functional layer with functions of anti-glaring or anti-fogging is formed by coating paint with functions of anti-glaring or anti-fogging, the paint includes metal oxide particles; the functional layer with hardening function is formed by coating polymer paint with hardening function or by directly harden by a chemical or physical method; functional layer with antireflection function is a titania coating, a magnesium fluoride coating or a calcium fluoride coating. It is to be understood that a plastic plate with good transmittance can be manufactured to the rigid transparent substrate according to a processing method of the strengthened glass.

Referring to FIG. 3, the second transparent insulating substrate 150 is made of a flexible material, such as flexible polyethylene terephthalate (PET), polycarbonate (PC), polyethylene (PE), polyvinyl chloride (PVC), polypropylene (PP), polystyrene (PS) or polymethyl methacrylate methyl ester (PMMA). Besides, in order to increase a adhesive strength of the of the second transparent insulating substrate 150, the first surface or second surface of the transparent insulating substrate 150 are provided with a tackifier layers 141, which facilitates a firmly attaching of the transparent insulating layer to the second transparent insulating substrate 150. What to be illustrated is that because the second transparent insulating substrate 150 is made of a flexible material, in a process of moving and handling, the flexible material is inevitably deformed or bent, the using of an embedded or buried driving electrode is more reliable.

In one specific embodiment of the first type of embodiments of the touch panel of the present disclosure, the first transparent insulating substrate 110 is made of strengthened glass, the second transparent insulating substrate 150 is made of plastics polyethylene terephthalate (PET), an sensing electrode layer including a meshed conductive circuit is formed on the strengthened glass, the driving layer 140 including a meshed conductive circuit is formed on a surface of the of the PET substrate, then a PET flexible substrate is attached to the first insulating substrate 110 made of strengthened glass, the flexible substrate is attached to the strengthened glass in a convenient way in the above embodiment to manufacture the touch panel of the present disclosure. The above manufacturing process is simple, besides the thickness of the touch panel is reduced.

Figure 8:
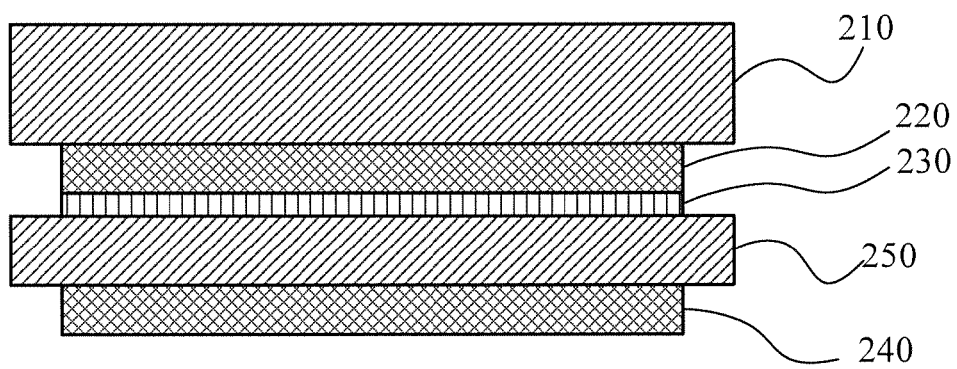
FIG. 8 is a cross sectional view of a second type of touch panels of the present disclosure.
Figure 9:
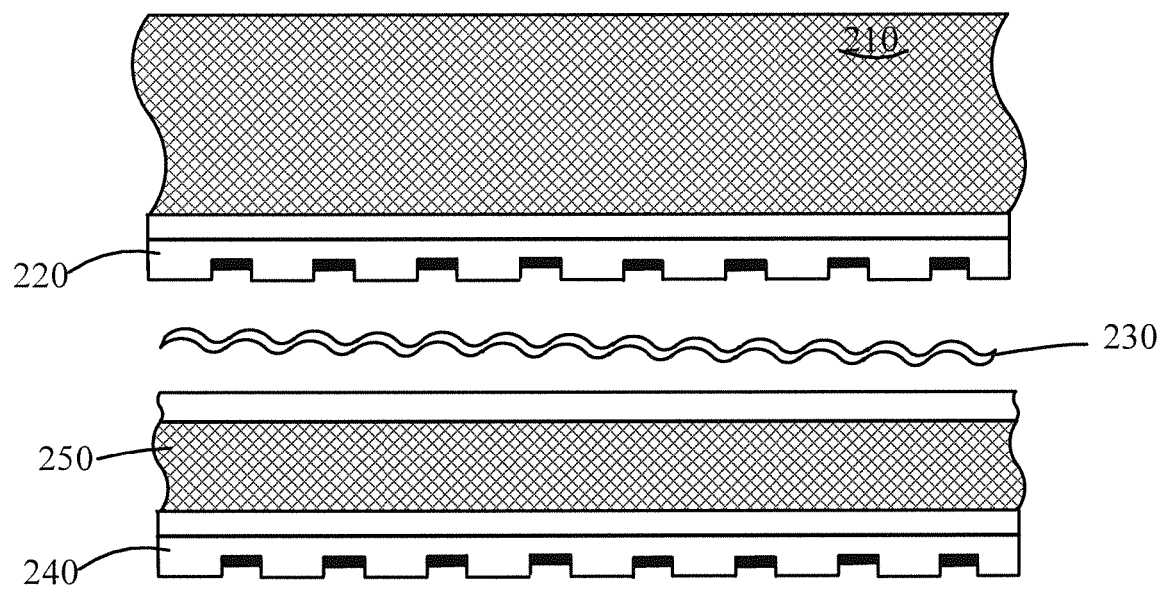
FIG. 9 is a cross sectional view of a specific embodiment shown in FIG. 8.

FIG. 8 and FIG. 9 are a cross sectional view of the second type of touch panels and a cross sectional view of a specific embodiment respectively. The difference between the present type of embodiments and the first type of embodiments are: the driving electrode layer 240 is disposed on a second surface of the second transparent insulating substrate 250, or in other word, compared to the first type of touch panels, a back side of the second transparent insulating substrate 250 with the driving electrode layer 240 is attached to the first transparent insulating substrate 210 as one. Forming methods of the sensing electrode layer 220 and the driving electrode layer 240 are different from that of the first type of embodiments.

Figure 10:
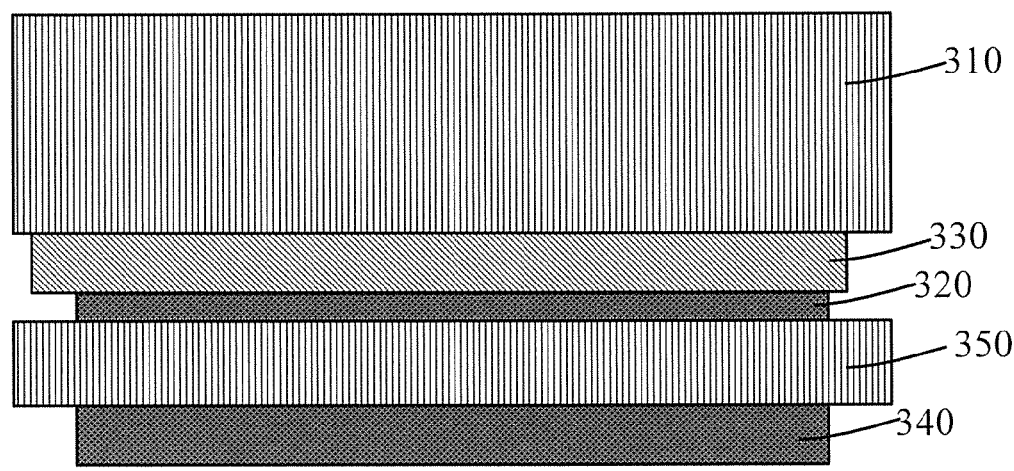
FIG. 10 is a cross sectional view of a third type of touch panels of the present disclosure.
Figure 11:
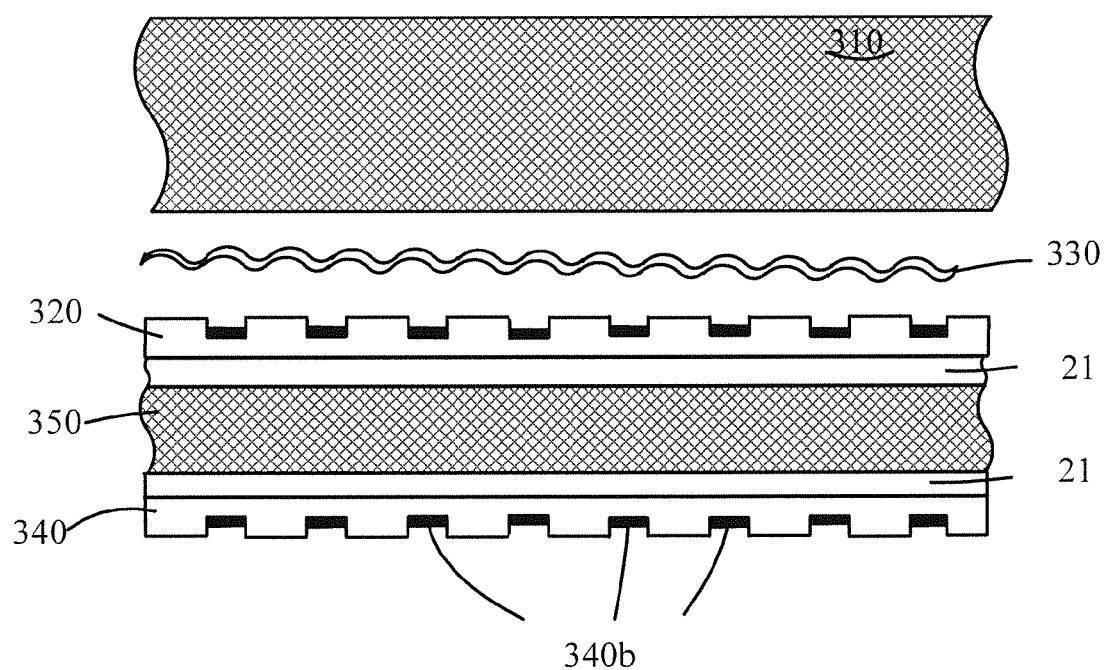
FIG. 11 is a cross sectional view of a specific embodiment shown in FIG. 10.

FIG. 10 and FIG. 11 show a cross sectional view of the touch panel of third type of embodiments of the present disclosure and a cross sectional view of a specific embodiment respectively. Compared to the first type of embodiments, the sensing electrode layer 320 is formed on the first surface of the second transparent insulating substrate 350, the driving electrode layer is formed on the second surface of the second transparent insulating substrate 350, i.e. it is a DITO structure. The driving electrode layer 340 includes a meshed conductive circuit 340b. The DITO structure is attached to the first transparent insulating substrate 310 by the adhesive layer 330. In the present type of embodiments, the first transparent insulating substrate 310 is made of a material selected from a group consisting of strengthened glass, flexible polyethylene terephthalate (PET), polycarbonate (PC), polyethylene (PE), polyvinyl chloride (PVC), polypropylene (PP), polystyrene (PS) or poly methyl methacrylate (PMMA).

Figure 12:
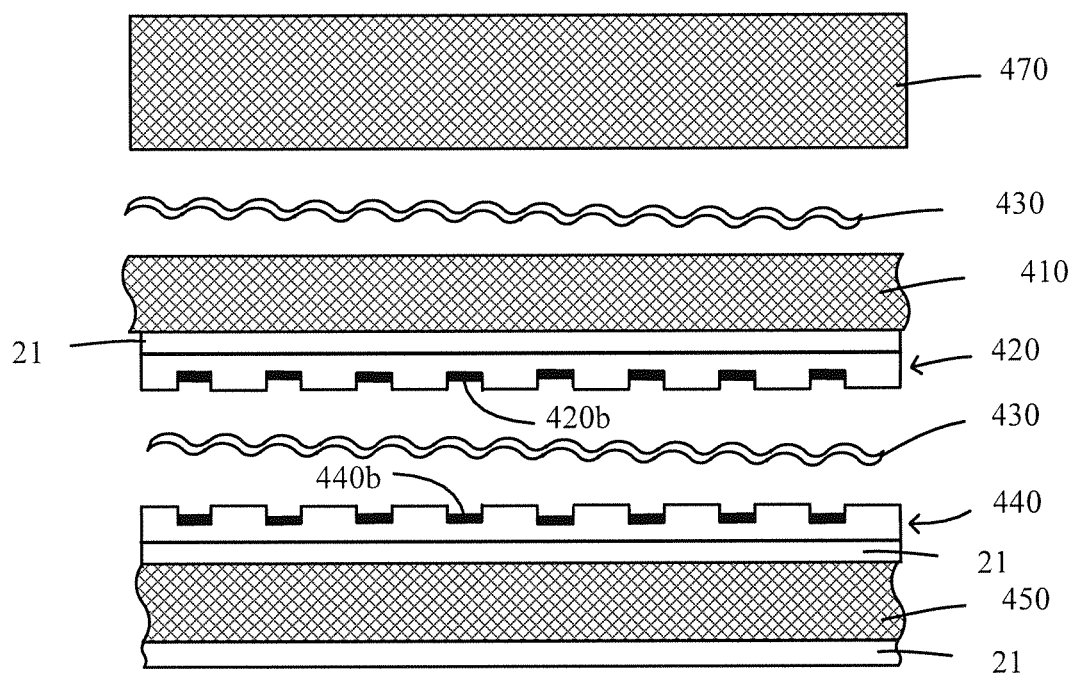
FIG. 12 is a cross sectional view of a specific embodiment of fourth type of touch panels of the present disclosure.

FIG. 12 is a cross sectional view of fourth type of embodiments of the present disclosure. The touch panel comprises sequentially stacked a second transparent insulating substrate 450, a driving electrode layer 440, a adhesive layer 430, a sensing electrode layer 420, a first transparent insulating substrate 430 and a third transparent insulating substrate 470. The sensing electrode layer 420 is bonded to the first transparent insulating substrate 410 by the tackifier layer 21; the driving electrode layer 440 is bonded to the second transparent insulating substrate 450 by the tackifier layer 21. The sensing electrode layer 420 includes a meshed conductive circuit 420b. The driving electrode layer 440 includes a meshed conductive circuit 440b. Compared to the above three type of embodiments, the third transparent insulating substrate 470 is also included in the present type of embodiments, the third transparent insulating substrate 470 is a strengthened glass plate or a flexible transparent plate. The flexible transparent plate is made of a material selected from a group consisting of flexible polyethylene terephthalate (PET), polycarbonate (PC), polyethylene (PE), polyvinyl chloride (PVC), polypropylene (PP), polystyrene (PS) or polymethyl methacrylate methyl ester (PMMA).

The differences between the present type of embodiments and the above three type of embodiments are: the first transparent insulating substrate 410 and the second transparent insulating substrate 450 are made of a material selected from a group consisting of strengthened glass, flexible polyethylene terephthalate (PET), polycarbonate (PC), polyethylene (PE), polyvinyl chloride (PVC), polypropylene (PP), polystyrene (PS) and polymethyl methacrylate methyl ester (PMMA). In a preferred embodiment, the first transparent insulating substrate 410 and the second transparent insulating substrate are flexible substrates, such as they are made of PET.

Figure 13A:
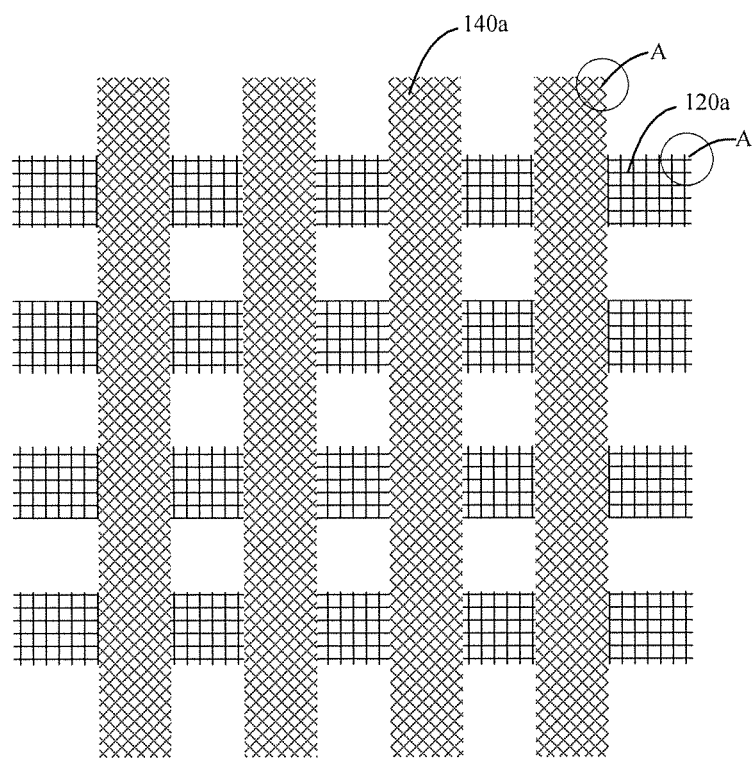
FIG. 13a and FIG. 13b are schematic views of arrangements and shapes of the sensing electrodes and driving electrodes.
Figure 13B:
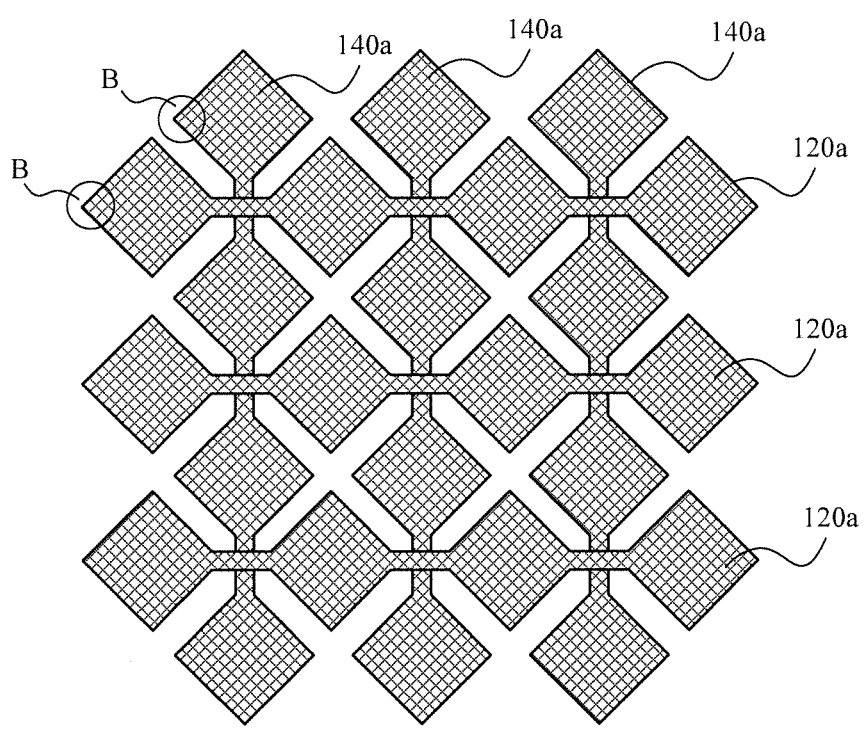

FIG. 13a and FIG. 13b are the schematic plan views of arrangements and shapes of the sensing electrode and driving electrode in accordance with several type of embodiments of the present disclosure. The independently disposed sensing electrodes are parallel to the first axis (X axis) and disposed equally spaced; the independently disposed driving electrodes are parallel to the second axis (Y axis) and disposed equally spaced. The sensing electrode and driving electrode of FIG. 13a are shaped as bars and arranged interlacingly and perpendicular to each other; the sensing electrode and driving electrode of FIG. 13b are shaped as diamonds and arranged interlacingly and perpendicular to each other.

FIG. 14a, FIG. 14b, FIG. 14c and FIG. 14d are partially enlarged views correspond to part A of FIG. 13a or part B of FIG. 13b respectively in accordance with one embodiment.

Figure 14A:
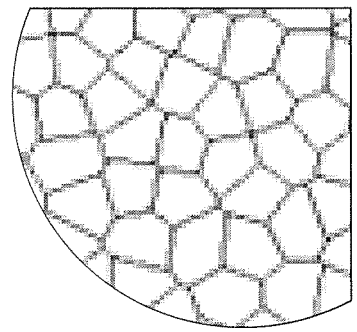
FIG. 14a, FIG. 14b, FIG. 14c and FIG. 14d are partially enlarged views correspond to part A of FIG. 13a or part B of FIG. 13b respectively in accordance with one embodiment.
Figure 14B:
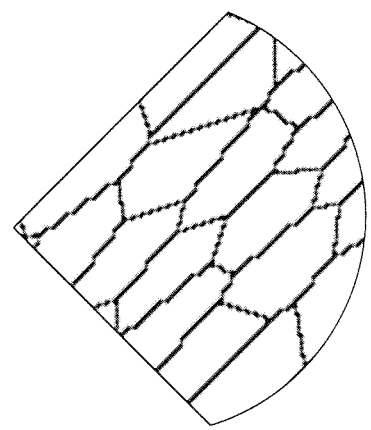

The meshed conductive circuit in FIG. 14a and FIG. 14b is an irregular mesh; the manufacturing of the irregular meshed conductive circuit is easy, related processes are saved.

Figure 14C:
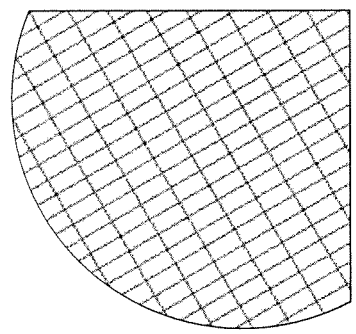
Figure 14D:
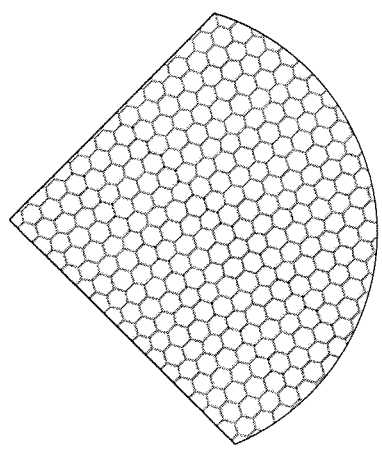

The meshed conductive circuit 140 of FIG. 14c and FIG. 14d is uniformly arranged regular patterns. The conductive mesh 11 is arranged uniformly and regularly, the mesh traces spacings $d_1$ are equal, on one hand, it makes the transmittance of the touch panel uniform; on the other hand, the surface resistance of the meshed conductive circuit is distributed uniformly, the resistance deviation is small, the settings for correcting the resistance bias are not needed to make the image uniform. The conductive mesh can be substantially orthogonal straight line lattice patterns, curved wavy line lattice patterns. The mesh cell of the meshed conductive circuit can be a regular graph, such as triangle, diamond or regular polygon etc.; it can also be an irregular graph.

What to be further illustrated is that the shapes of the mesh of the meshed conductive circuits included by the driving electrode and sensing electrode can be different, i.e. the shapes of the mesh of the meshed conductive circuits included by the driving electrode and sensing electrode are regular geometry shapes or irregular geometry shapes. In the alternative embodiments, shapes of the mesh of the meshed conductive circuits included by the sensing electrode are regular geometry shapes, and shapes of the mesh of the meshed conductive circuits included by the driving electrode are irregular geometry shapes.

Figure 15:
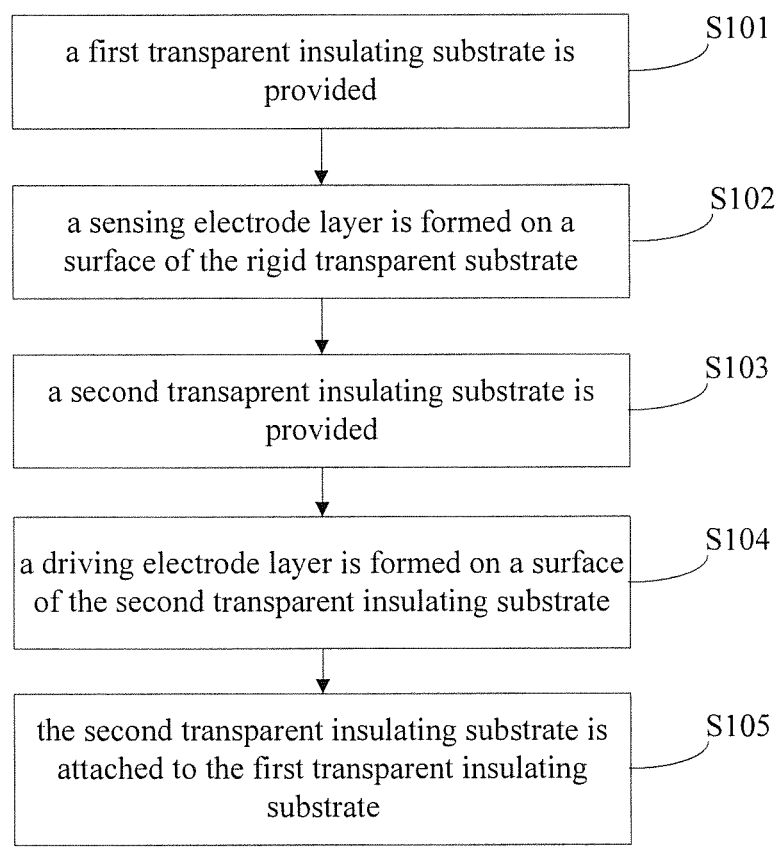
FIG. 15 is a flowchart of a method of manufacturing the touch panel in accordance with one embodiment.

It can be further understood that shapes of the mesh of the meshed conductive circuits included by the driving electrode of the driving electrode layer form a differentiated combination, and/or shapes of the mesh of the meshed conductive circuits included by the sensing electrode of the sensing electrode layer form a differentiated combination Referring to FIG. 15, it is a flowchart of the method of manufacturing a touch panel in accordance with one embodiment. Also referring to FIG. 3, the method includes the following steps.

Step S101: a first transparent insulating substrate is provided. The first transparent insulating substrate 110 is a rigid transparent insulating substrate or a flexible transparent insulating substrate; the rigid transparent insulating substrate can be the strengthened glass or flexible transparent panel. The flexible transparent panel is made of a material selected from a group consisting of the flexible polyethylene terephthalate (PET), polycarbonate (PC), polyethylene (PE), polyvinyl chloride (PVC), polypropylene (PP), polystyrene (PS) and polymethyl methacrylate acrylate (PMMA).

Step S102: a sensing electrode layer is formed on a surface of the rigid transparent substrate.

Step S103: a second transparent insulating substrate is provided. The second transparent insulating substrate 150 is a flexible transparent insulating substrate, it is made of a material selected from a group consisting of flexible polyethylene terephthalate (PET), polycarbonate (PC), polyethylene (PE), polyvinyl chloride (PVC), polypropylene (PP), polystyrene (PS) and polymethyl methacrylate methyl ester (PMMA). The second transparent insulating substrate 150 is a flexible film, it can be easily attached to the rigid first transparent insulating substrate 110.

Step S104: a driving electrode layer is formed on a surface of the second transparent insulating substrate.

There is not an order in the steps of S101 to S102 and steps of S103 to S104. It can be first to form the sensing electrode layer 120 on the first transparent insulating layer 140, it can also be first to form the driving electrode layer 140 on the second transparent insulating substrate 150, or they can be done at the same time.

Step S105: the second transparent insulating substrate is attached to the first transparent insulating substrate.

The way of attachment can be shown in FIG. 3, a surface which is provided with the driving electrode layer 140 of the second transparent insulating substrate 150 is attached to a surface which is provided with the sensing electrode layer 120 of the first transparent insulating substrate 110. It can also be shown in FIG. 11, a surface which is not provided with the driving electrode layer 240 of the second transparent insulating substrate 250 is attached to a surface which is provided with the sensing electrode layer 220 of the first transparent insulating substrate 210.

Figure 16:
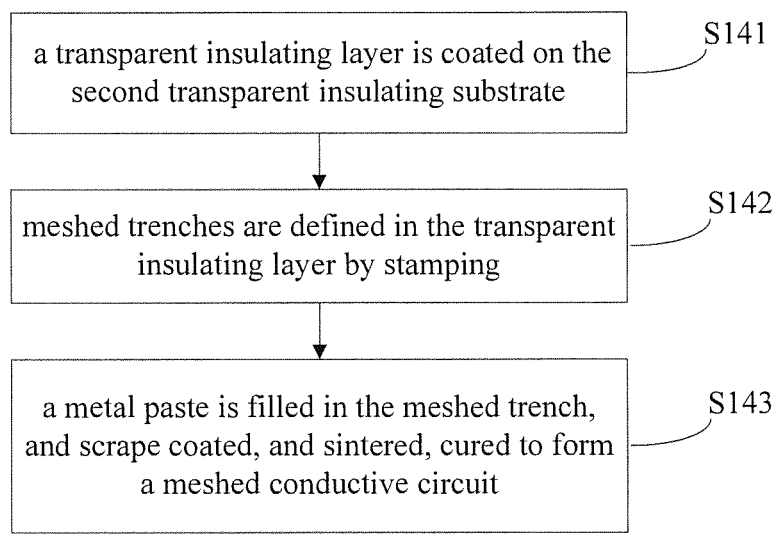
FIG. 16 is a specific flowchart of step 104 of a process shown in FIG. 15.
Figure 17:
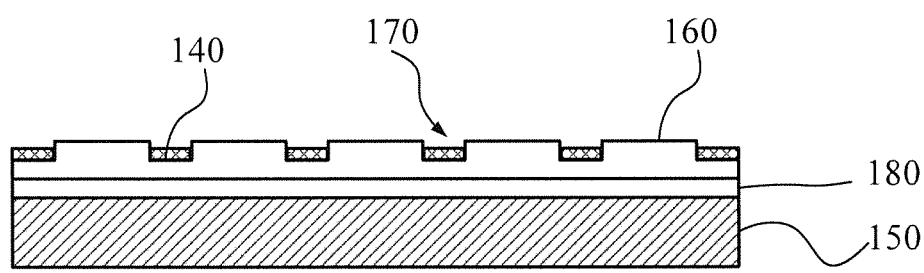
FIG. 17 is a layered structure of the driving electrode layer obtained according to step 104 of a process shown in FIG. 15.

Referring to FIG. 16 and FIG. 17, the steps of S102 and S104 specifically includes:

Step S141: a transparent insulating layer is coated on the second transparent insulating substrate. The coating the transparent insulating layer on the second transparent insulating substrate is selected as an example for illustrating. The transparent insulating layer is preferably a UV (ultraviolet) adhesive. In order to increase the adhesive strength of the UV adhesive and the second transparent insulating substrate, a tackifier layer can be disposed between the second transparent insulating substrate 150 and the transparent insulating layer 160.

Step S142: meshed trenches are defined in the transparent insulating layer by stamping. Referring to FIG. 17, the transparent insulating layer 160 defines several meshed trenches 170 which have the same shape with the sensing electrode layer after mold pressing; the driving electrode layer 140 is formed in the meshed trench 170.

Step S143: a metal paste is filled in the meshed trench, and scrape coated and sintered, cured to form a meshed conductive circuit. The metal paste is filled in the meshed trench 170, and scrape coated to make the meshed trench fill with the metal paste, and then it is sintered, cured to form a conductive mesh. The metal paste is preferably nano silver paste. In the alternative embodiments, the metal which forms the meshed conductive circuit can be one selected from a group consisting of gold, silver, copper, aluminum, zinc, gold-plated silver and alloys of at least two above metals.

In the other embodiments, the meshed conductive circuit can also be manufactured by other process, for example, the meshed conductive circuit of the present disclosure is manufactured by photolithography.

Furthermore, referring to FIG. 12, it can also be that the transparent panel 470 is formed on the first transparent insulating substrate 410. The transparent panel 470 can be a strengthened glass panel or a flexible transparent plate.

Figure 18:
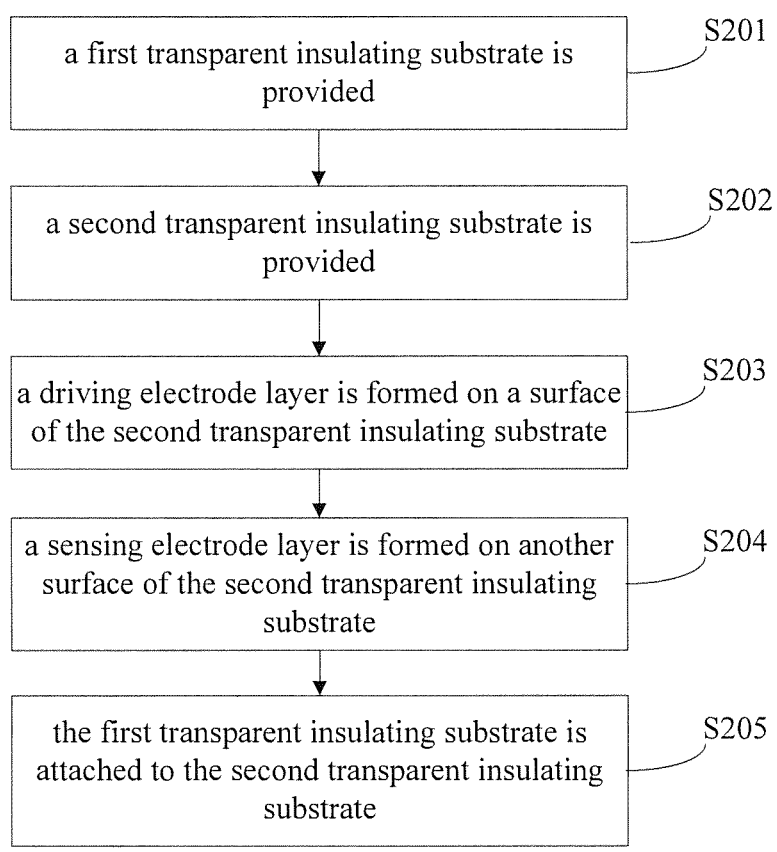
FIG. 18 is a flowchart of a method of manufacturing the touch panel in accordance with another embodiment.

Referring to FIG. 18, it is a flowchart of a method of manufacturing the touch panel in accordance with another embodiment. Referring also to FIG. 11, the method includes the following steps.

Step S201: a first transparent insulating substrate is provided. The first transparent insulating substrate 310 is a rigid transparent insulating substrate or a flexible transparent insulating substrate; the rigid transparent insulating substrate can be a strengthened glass plate or flexible transparent panel. The flexible transparent panel is made of a material selected from a group consisting of the flexible polyethylene terephthalate (PET), polycarbonate (PC), polyethylene (PE), polyvinyl chloride (PVC), polypropylene (PP), polystyrene (PS) and polymethyl methacrylate acrylate (PMMA).

Step S202: a second transparent insulating substrate is provided. The second transparent insulating substrate 350 is a flexible transparent insulating substrate, it is made of a material selected from a group consisting of flexible polyethylene terephthalate (PET), polycarbonate (PC), polyethylene (PE), polyvinyl chloride (PVC), polypropylene (PP), polystyrene (PS) and polymethyl methacrylate methyl ester (PMMA). The second transparent insulating substrate 350 is a flexible thin film, it can be easily attached to the first transparent insulating substrate 310.

Step S203: a driving electrode layer is formed on a surface of the second transparent insulating substrate.

Step S204: a sensing electrode layer is formed on another surface of the second transparent insulating substrate.

A sequence between step S203 and step S204 is arbitrary. It can be first to form the sensing electrode layer 320 on the first transparent insulating layer 140, it can also be first to form the driving electrode layer 340 on the second transparent insulating substrate 350.

Step S205: the first transparent insulating substrate is attached to the second transparent insulating substrate.

The way of attachment is specifically that the first transparent insulating substrate 310 is attached to a surface which is not provided with the sensing electrode layer 320 of the second transparent insulating substrate 350.

Figure 19:
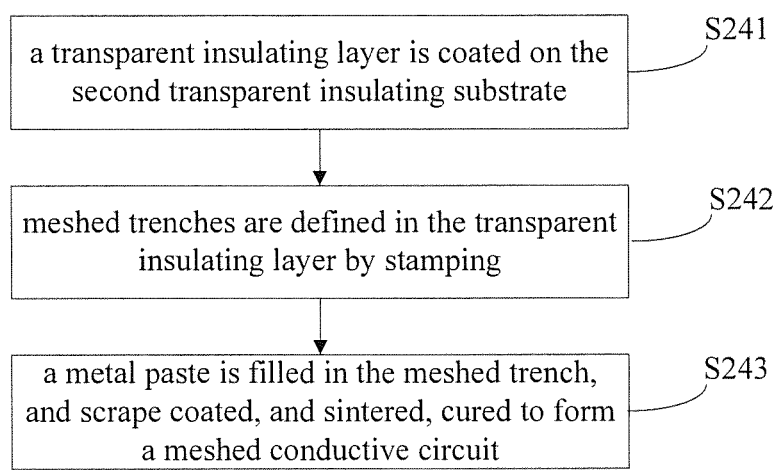
FIG. 19 is a specific flowchart of step S202 of a process shown in FIG. 18.

Referring to FIG. 18 to FIG. 19, the step S204 specifically includes:

Step S241: a transparent insulating layer is coated on the second transparent insulating substrate. The transparent insulating layer 160 is preferably a UV (ultraviolet) adhesive. In order to increase the adhesive strength of the UV adhesive and the flexible insulating substrate, a tackifier layer can be disposed between the second transparent insulating substrate 350 and the transparent insulating layer.

Step S242: meshed trenches are defined in the transparent insulating layer by stamping. This step is similar to step S142, referring to FIG. 17, the transparent insulating layer is formed on the second transparent insulating substrate, the transparent insulating layer defines several meshed trenches which have the same shape with the driving electrode after mold pressing; the driving electrode layer 340 is formed in the meshed trench 170.

Step S243: a metal paste is filled in the meshed trench, and scrape coated and sintered, cured to form a meshed conductive circuit. The metal paste is filled in the meshed trench, and scrape coated to make the meshed trench fill with the metal paste, and then it is sintered, cured to form a conductive mesh. The metal paste is preferably nano silver paste. In the alternative embodiments, the metal which forms the meshed conductive circuit can be one selected from a group consisting of gold, silver, copper, aluminum, zinc, gold-plated silver and alloys of at least two above metals.

In the alternative embodiments, the meshed conductive circuit can also be manufactured by other process, for example, the meshed conductive circuit of the present disclosure is manufactured by photolithography.

Furthermore, it can also be that the transparent panel is formed on the first transparent insulating substrate. The transparent panel can be a strengthened glass plate or a flexible transparent panel.

The driving electrode of the touch panel is manufactured to the conductive grid formed by the meshed conductive circuit in the above method, the touch panel do not have the problems of that the surface is easy to be scratched or peeled off, the cost is high, the surface resistance is high for the large size panel when the ITO film is used, so the cost of the touch panel is low, the sensitivity is higher.

Although the present disclosure has been described with reference to the embodiments thereof and the best modes for carrying out the present disclosure, it is apparent to those skilled in the art that a variety of modifications and changes may be made without departing from the scope of the present disclosure, which is intended to be defined by the appended claims.

What is claimed is:

1. A touch panel, comprising:
   a first transparent insulating substrate;
   a second transparent insulating substrate including a first surface facing the first transparent insulating substrate and a second surface opposite to the first surface;
   a sensing electrode layer formed on a surface of the first transparent insulating substrate, the sensing electrode layer including a first transparent insulating layer and a plurality of independently disposed sensing electrodes contained within the first transparent insulating layer, each sensing electrode having a meshed conductive circuit; and
   a driving electrode layer formed on the first surface of the second transparent insulating substrate, the driving electrode layer including a plurality of independently disposed driving electrodes, each driving electrode having a meshed conductive circuit, wherein both the sensing electrode layer and the driving electrode layer are disposed between the first and second transparent insulating substrates.

2. The touch panel according to claim 1, wherein a meshed spacing of the meshed conductive circuit is defined as d1, and 100 μm≤d1<600 μm; a surface resistance of the meshed conductive circuit is defined as R, and 0.1 Ω/sq≤R<200 Ω/sq.

3. The touch panel according to claim 1, wherein the driving electrode layer includes a second transparent insulating layer, the driving electrodes being contained within the second transparent insulating layer.

4. The touch panel according to claim 3, wherein the first and second transparent insulating layers have a plurality of interlaced meshed trenches formed therein, the meshed conductive circuit is received in the meshed trenches.

5. The touch panel according to claim 3, wherein the first and second transparent insulating layers are formed by curing one of a light curing glue, or thermosetting adhesive, or air-drying adhesive.

6. The touch panel according to claim 1, wherein the first transparent insulating substrate is a rigid substrate, the second transparent insulating substrate is a flexible substrate.

7. The touch panel according to claim 6, wherein the first rigid transparent insulating substrate is a strengthened glass, the second flexible transparent insulating substrate is made of a material selected from a group consisting of polyethylene terephthalate, polycarbonate, polyethylene, polyvinyl chloride, polypropylene, polystyrene and polymethyl methacrylate.

8. The touch panel according to claim 1, wherein the first transparent insulating substrate is a flexible substrate, the second transparent insulating substrate is a rigid substrate or a flexible substrate.

9. The touch panel according to claim 8, further comprising a transparent panel attached to a surface of the first transparent insulating substrate.

10. The touch panel according to claim 9, wherein the transparent panel is a strengthened glass panel or a flexible transparent touch panel.

11. The touch panel according to claim 1, further comprising an adhesive layer, wherein the adhesive layer is formed between the first transparent insulating substrate and the second transparent insulating substrate.

12. The touch panel according to claim 11, wherein the adhesive layer is an optically transparent OCA or a LOCA.

13. The touch panel according to claim 1, wherein a mesh of the meshed conductive circuit is a regular geometric shape mesh.

14. The touch panel according to claim 1, wherein a mesh of the meshed conductive circuit is an irregular geometric shape mesh.

15. The touch panel according to claim 1, wherein the meshed conductive circuit is made of silver, a mesh traces spacing of the meshed conductive circuit ranges from 200 μm to 500 μm; a surface resistance of the meshed conductive circuit is defined as R, and 4 Ω/sq≤R<50 Ω/sq, a coating amount of silver ranges from 0.7 g/m$^2$ to 1.1 g/m$^2$.

16. The touch panel according to claim 1, wherein the meshed conductive circuit is made of a material selected from the group consisting of: gold, silver, copper, aluminum, zinc, gold-plated silver, and alloys of at least two of the preceding metals.

17. A touch panel, comprising:
   a rigid transparent insulating substrate;
   a sensing electrode layer embedded or buried in a surface of the rigid transparent insulating substrate, the sensing electrode layer including a plurality of independently disposed sensing electrodes; each sensing electrode of the sensing electrode layer having a meshed conductive circuit;
   a flexible transparent insulating substrate including a first surface and a second surface opposite to the first surface, and
   a driving electrode layer embedded or buried in the first surface of the flexible transparent insulating substrate, the driving electrode layer including a plurality of independently disposed driving electrodes, each driving electrode of the driving electrode layer having a meshed conductive circuit;

wherein the first surface of the flexible transparent insulating substrate is attached to the rigid transparent insulating substrate, and both the sensing electrode layer and the driving electrode layer are disposed between the rigid transparent insulating substrate and the flexible transparent insulating substrate.

18. The touch panel according to claim 17, wherein a meshed spacing of the meshed conductive circuit is defined as $d_1$, and 100 μm≤$d_1$<600 μm; a surface resistance of the meshed conductive circuit is defined as R, and 0.1 Ω/sq≤R<200 Ω/sq.

19. The touch panel according to claim 17, wherein the rigid transparent insulating substrate is a strengthened glass, and wherein the flexible transparent insulating substrate is made of a material selected from the group consisting of: flexible polyethylene terephthalate, polycarbonate, polyethylene, polyvinyl chloride, polypropylene, and polystyrene- and polymethyl methacrylate.

20. The touch panel according to claim 17, wherein a mesh of the meshed conductive circuit is a regular geometric shape mesh.

21. The touch panel according to claim 20, wherein a shape of a cell of the mesh is one of a single triangle, or diamond, or regular polygon.

22. The touch panel according to claim 17, wherein a mesh of the meshed conductive circuit is an irregular geometric shape mesh.

23. A method of manufacturing a touch panel, comprising:
providing a first transparent insulating substrate;
forming a sensing electrode by a meshed conductive circuit which includes a plurality of mesh cells;
providing a first transparent insulating layer by containing a plurality of the sensing electrodes within the first transparent insulating layer to form a sensing electrode layer;
forming the sensing electrode layer on a surface of the first transparent insulating substrate;
providing a second transparent insulating substrate;
forming a driving electrode by a meshed conductive circuit which includes a plurality of mesh cells;
providing a second transparent insulating layer by containing a plurality of the driving electrodes within the second transparent insulating layer to form a driving electrode layer;
forming the driving electrode layer on a surface of the second transparent insulating substrate; and
attaching the second transparent insulating substrate to the first transparent insulating substrate, wherein both the sensing electrode layer and the driving electrode layer are disposed between the first and second transparent insulating substrates.

24. The method according to claim 23, wherein the formation of the sensing electrode layer on a surface of the first transparent insulating substrate and the formation of the driving electrode layer on a surface of the second transparent insulating substrate includes:
coating the first transparent insulating layer on the first transparent insulating substrate and the second transparent insulating layer on the second transparent insulating substrate;
defining a meshed trench on the first and second transparent insulating layers by stamping;
forming a meshed conductive circuit in the meshed trench.

25. The method according to claim 24, wherein the formation of the meshed conductive circuit in the meshed trench includes: filling a metal paste to the meshed trench, and scrape coating, sintering and curing the metal paste.

26. The method according to claim 23, wherein attaching the second transparent insulating substrate to the first transparent insulating substrate includes either of: attaching a surface that is formed with the driving electrode layer of the second transparent insulating substrate to a surface that is formed with the sensing electrode layer of the first transparent insulating substrate, or attaching a surface that is not formed with the driving electrode layer of the second transparent insulating substrate to a surface that is formed with the sensing electrode layer of the first transparent insulating substrate.

27. The method according to claim 23, further comprising: forming a transparent panel on a surface of the first transparent insulating substrate.

28. The method according to claim 27, wherein the transparent panel is one of a strengthened glass panel, or a flexible transparent panel.

* * * * *